United States Patent
Valadon

(10) Patent No.: US 8,422,542 B2
(45) Date of Patent: Apr. 16, 2013

(54) RECONFIGURABLE SIGNAL PROCESSING SCHEME

(75) Inventor: Cyril Valadon, Letch-worth (GB)

(73) Assignee: MStar Semiconductor, Inc., Grand Cayman (KY)

( * ) Notice: Subject to any disclaimer, the term of this patent is extended or adjusted under 35 U.S.C. 154(b) by 713 days.

(21) Appl. No.: 12/373,984

(22) PCT Filed: Jul. 24, 2007

(86) PCT No.: PCT/GB2007/002811
§ 371 (c)(1),
(2), (4) Date: Jan. 15, 2009

(87) PCT Pub. No.: WO2008/012522
PCT Pub. Date: Jan. 31, 2008

(65) Prior Publication Data
US 2010/0008405 A1    Jan. 14, 2010

(30) Foreign Application Priority Data
Jul. 28, 2006 (GB) .................................. 0615067.6

(51) Int. Cl.
*H03H 7/30* (2006.01)
(52) U.S. Cl.
USPC ........................................................ 375/229
(58) Field of Classification Search .................. 375/346, 375/148, 229, 230, 231, 232
See application file for complete search history.

(56) References Cited

U.S. PATENT DOCUMENTS

| 7,756,543 B2* | 7/2010 | Englund et al. ............... 455/522 |
| 2003/0087622 A1* | 5/2003 | Jayaraman et al. ........... 455/307 |
| 2003/0103491 A1* | 6/2003 | Frederiksen et al. ......... 370/351 |
| 2003/0108025 A1* | 6/2003 | Kim et al. ..................... 370/342 |
| 2004/0224697 A1* | 11/2004 | Hakkinen et al. ............. 455/450 |
| 2004/0240531 A1 | 12/2004 | Black et al. |
| 2007/0060187 A1* | 3/2007 | Englund et al. ............... 455/522 |

FOREIGN PATENT DOCUMENTS

WO    2004/017655 A1    2/2004

OTHER PUBLICATIONS

Latva-Aho, M. et al., "Reconfigurable Adaptive RAKE receiver for Wideband CDMA Systems," IEEE 48th Vehicular Technology Conference, vol. 3, May 18-21, 1998, XP010288219, pp. 1740-1744.
Hooli, K., et al., "Chip-Level Channel Equalization in WCDMA Downlink," EURASIP Journal of Applied Signal Processing, 2002:8, XP002997529, pp. 757-770.

\* cited by examiner

*Primary Examiner* — Jaison Joseph
(74) *Attorney, Agent, or Firm* — Edell, Shapiro & Finnan, LLC

(57) ABSTRACT

A method of ameliorating channel effects present in a signal received through a channel, wherein the signal conveys at least first and second information streams and the method comprises the steps of determining from the first stream activation of the second stream and processing the signal to ameliorate channel effects, when the second stream is present, in a first manner comprising filtering the signal through filter means to ameliorate channel dispersion and then processing the signal through Rake receiver means or, when the second stream is absent, in a second manner comprising processing the signal through the Rake receiver means without prior amelioration of channel dispersion by the filter means.

9 Claims, 3 Drawing Sheets

RECONFIGURABLE SIGNAL PROCESSING SCHEME

BACKGROUND

The present invention relates to signal processing apparatus and methods for ameliorating channel effects in a signal received through a propagation channel, e.g. between a node B and a UE in a UMTS network.

High-Speed Downlink Packet Access (HSDPA) is an evolution of the Release 99 version of the 3GPP standard aimed at providing improved user experience through increased data rates and reduced end-to-end latency. These improvements are delivered through a combination of Incremental Redundancy (IR) and the use of higher-order modulation schemes. HSDPA extends the capabilities of 3GPP by introducing the use of the 16QAM modulation for the data bearing channels. 16QAM is more spectrally efficient than the QPSK modulation used in 3G. However, it is also more sensitive to impairments introduced in the transmission link. Hence, in order to fully exploit the benefits of the new features introduced in HSDPA, it is important to select an implementation of the demodulation unit which is resistant to noise and interference.

For W-CDMA systems, it is typical to use a Rake architecture in the receiver (*CDMA—Principles of Spread Spectrum Communication*, Andrew J. Viterbi, *Addison-Wesley Wireless Communications Series*). The Rake receiver combines the contributions from the different paths in the propagation channel in order to generate samples to be processed by the channel decoder. The Rake receiver is therefore able to exploit the diversity provided by the propagation channel. However, the decisions generated by the Rake receiver suffer from an increase in noise level due to ISI.

More recently, new receiver architectures have been introduced where the demodulation accuracy is improved at the expense of the implementation complexity. The Linear Minimum Mean Square Error (LMMSE) equaliser is an example of such an architecture (*Chip-Level Channel Equalization in WCDMA Downlink*, K. Hooli, M. Juntti, M. J. Heikkila, P. Komulainen, M. Latva-aho, J. Lilleberg, *EURASIP Journal on Applied Signal Processing*, August 2002). The LMMSE equaliser improves the performance of the demodulation unit by mitigating the distortions introduced by the propagation channel. The LMMSE equaliser can be implemented using a pre-filter Rake architecture (*Equalization in WCDMA terminals*, Kari Hooli, *PhD thesis,* 2003) where the conventional Rake receiver is preceded by a linear filter which aims at removing the ISI introduced by the channel.

The information intended for a user may be sent over more than one logical channel. In HSDPA for example, the information is sent over the combination of one control and one dedicated channel. The dedicated HS-DSCH channel contains the information intended for a specific user. The HS-SCCH control channel is used to carry information on the format of the HS-DSCH transmission. Both QPSK and 16QAM modulation schemes can be used on the HS-DSCH channel. In order to demodulate the transmitted information, the receiver needs to know which modulation scheme was employed by the transmitter. Information of the modulation scheme is transmitted on the HS-SCCH channel. The HS-SCCH also carries information required to configure the channel decoding section of the receiver. Hence, both the HS-SCCH control channel and the HS-DSCH dedicated channel need to be processed at the receiver in order to recover the transmitted information.

The HS-SCCH channel is also used to control and signal the multiplexing of the different users in the downlink. Users do not necessarily receive information continuously. The set of users to which information is transmitted from the node B can vary at each Transmission Time Interval (TTI) boundary. It is therefore required to indicate to the different users the TTIs during which they should be trying the demodulate data on the HS-DSCH. This is performed using the HS-SCCH control channels. Typically, a receiver will listen to the HS-SCCH so that it can detect when information needs to be received on the HS-DSCH channel. Hence, the receiver typically needs to process the HS-SCCH channel continuously (this depends on the capability class of the receiver) but should only process the HS-DSCH channel when signalled to do so.

The HS-SCCH and HS-DSCH channels are transmitted with different formats. The HS-SCCH channel uses a spreading factor equal to 128 and is always QPSK modulated. The spreading format of the HS-DSCH is lower and equal to 16. Moreover, both QPSK and 16QAM modulations can be used on the HS-DSCH channel.

SUMMARY OF THE INVENTION

The present invention provides an adaptive architecture where the processing performed by a digital communication receiver varies with the results from the demodulation and decoding of a control channel. According to one aspect of the invention, multiple receiver configurations are defined and are selected dynamically.

In one embodiment of the invention, a demodulation unit can be configured to operate in two different modes. The default configuration, typically with a low complexity and low power consumption, is used to monitor information received on a channel. This channel will typically be a control channel. Based on the information received on this channel, a decision is made as to whether the receiver configuration should be modified to the second mode of operation. The second receiver configuration may offer better link level performance at the expense of increased complexity and power-consumption.

In one embodiment, the receiver is designed to receive the HS-SCCH and HS-DSCH channels transmitted in the HSDPA system and the configuration of the receiver is controlled according to the information retrieved during the reception of the first slot of the HS-SCCH TTI. A default configuration is used to monitor the information on the HS-SCCH channel. If the information retrieved from the HS-SCCH channel indicates that data should be received on the HS-DSCH channel, the receiver configuration is modified to operate in a mode offering a better link level performance.

According to one aspect of the invention, the different configurations are implemented and selected by dynamically enabling and disabling isolated elements in the receiver. By using such an approach, it is possible to implement multiple receiver configurations without duplicating hardware or software resources.

In one embodiment, the receiver is implemented as a pre-filter Rake receiver and is configured by default to perform the processing corresponding to a conventional Rake receiver. This can be achieved, for example, by disabling the pre-filter part of the receiver. When, in the context of HSDPA, it is indicated that information needs to be retrieved on an HS-DSCH channel, the configuration is modified so as to implement a LMMSE equaliser. This can be achieved by appropriately setting the taps of the pre-filter.

According to one aspect, the present invention provides signal processing apparatus for ameliorating channel effects present in a signal received through a channel, the apparatus comprising filter means for filtering the signal to ameliorate channel dispersion and Rake receiver means, wherein a signal received via the channel can be processed in at least first and second modes wherein, in said first mode, channel dispersion in the signal is ameliorated by the filter means before processing the signal through the Rake receiver means and, in said second mode, the signal is processed by the Rake receiver means without prior amelioration of channel dispersion by the filter means.

The invention also consists in a method of ameliorating channel effects present in a signal received through a channel, wherein the signal conveys at least first and second information streams and the method comprises the steps of determining from the first stream activation of the second stream and processing the signal to ameliorate channel effects by, when the second stream is present, in a manner comprising filtering the signal through filter means to ameliorate channel dispersion and then processing the signal through Rake receiver means or by, when the second stream is absent, in a manner comprising processing the signal through the Rake receiver means without prior amelioration of channel dispersion by the filter means.

Thus the invention provides that processing resources are conserved, which may also translate to an energy saving.

Typically, the filter means requires configuration in order to be effective in ameliorating channel dispersion in the signal. Such configuration activity can be forgone when the filter means is not ameliorating channel dispersion ahead of the Rake receiver means. Accordingly, a further saving of processing resources may thus be made. Typically, such configuration is based on an assessment of the channel dispersion, e.g. as provided by a channel impulse response estimate, which is then used to calculate an appropriate configuration for the filter means, e.g. by a matrix inversion technique.

In certain embodiments, the filter means is disabled when it is not actively ameliorating channel dispersion in the input to the Rake receiver means. In other embodiments, however, it is arranged that the filter means is set to some default state, e.g. a transparent state in which the filter means is substantially ineffective in combating channel dispersion.

According to another aspect, the invention provides signal processing apparatus for ameliorating channel effects present in a signal received through a channel, the apparatus comprising filter means for filtering the signal to ameliorate channel dispersion, Rake receiver means and means for determining from an assessment of the channel a configuration for the filter means, wherein a signal received via the channel can be processed in at least first and second modes, wherein, in said first mode, alteration of the configuration of the filtering means is permitted and in which the filter means operates on the signal en route to the Rake receiver means and, in said second mode, alteration of said configuration to track channel dispersion is not permitted.

The invention also consists in a method of ameliorating channel effects present in a signal received through a channel, wherein the signal conveys at least first and second information streams and the method comprises the steps of determining from the first stream activation of the second stream and processing the signal to ameliorate channel effects, when said second stream is present, in a manner comprising processing the signal through Rake receiver means after filtering the signal through filter means to ameliorate channel dispersion with the filter means adapting to track channel dispersion changes or, when the second stream is absent, in a manner comprising processing the stream through the Rake receiver means without adaptation of the filter means to track channel dispersion changes.

Thus the invention provides the possibility of conserving processing resources since adaptation of the filter means need not always be necessary.

In certain embodiments, the signal is an HSDPA transmission comprising an HS-SCCH channel and an HS-DSCH channel.

In certain embodiments, the filter means is a prefilter to the Rake receiver means which, when operated together, form the basis of an LMMSE receiver architecture.

The transition between the first and second modes may be triggered, in certain embodiments, by the nature of the signal. For example, the signal may comprise first and second information streams with the first stream serving to announce activation of the second stream. Where such a scheme prevails, it could be arranged that the first mode is used when the second stream is present and the second mode when the second stream is absent.

Although the invention has primarily been described in terms of apparatus and methods, the invention also extends to programs for execution through suitable data processing equipment to perform signal processing techniques in accordance with the present invention.

By way of example only, certain embodiments of the present invention will now be described with reference to the accompanying drawings, in which:

DETAILED DESCRIPTION

Figure 1:
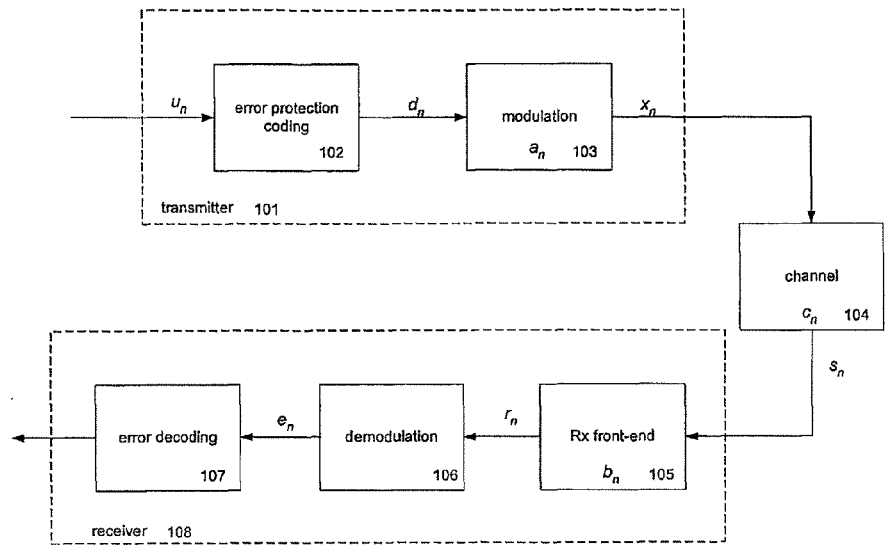
FIG. 1 a typical digital communication system where the invention may be used.

FIG. 1 presents a typical digital communication system. The transmitter 101 passes information bits through a block adding error protection coding 102 and then through a modulation block 103 which modulates the coded information onto a radio carrier. As part of the modulation, known symbols may be added to assist with radio channel estimation in the receiver.

Once transmitted, the radio signal then passes through the radio channel 104 before reception 108. This radio channel frequently gives rise to Inter-Symbol Interference (ISI) which must then be removed by the receiver to ensure correct reception. Before being processed by the receiver blocks, the signal also acquires both interference and noise. The interference arises from other users of the spectrum whilst the noise is thermal noise from the environment. Additional noise is then added as the signal passes through the Rx front end 105.

The receiver 108 converts the analogue radio signal to a digital base band signal in the Rx front-end 105. The signal is then passed through the demodulation block 106. This serves to estimate the transmitted coded-bits in the presence of the ISI, interference and noise added by the radio channel and the Rx front end. The signal is then decoded at 107 to yield the final received information bits.

Figure 2:
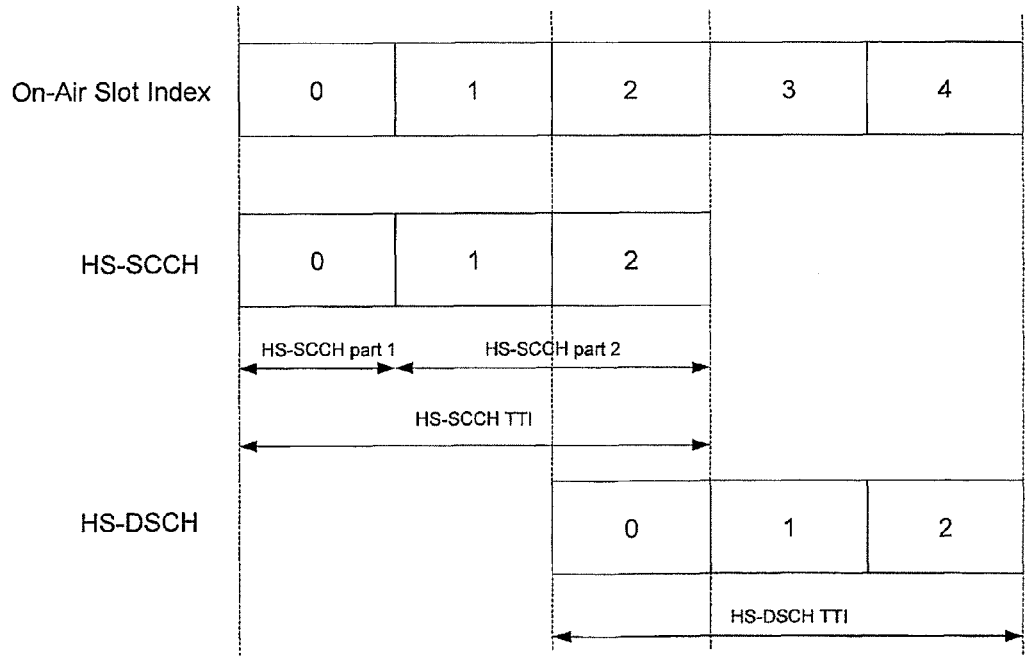
FIG. 2 presents the transmission format of the HS-SCCH and HS-DSCH channels defined in the HSDPA system.

The system shown in FIG. 1 is enabled for HSDPA. FIG. 2 presents the transmission formats for both the HS-SCCH and HS-DSCH channels that are defined for HSDPA relative to an arbitrary on-air slot indexing scheme. For both the HS-SCCH and the HS-DSCH channel, the TTI lasts 3 slots. It can however be seen that the start of the TTI for the HS-DSCH is not aligned to that of the HS-SCCH channel. The start of the TTI for the HS-DSCH channel is delayed by 2 slots. This format has been selected such that information from the first slot of the HS-SCCH channel can be received and decoded before being used to configure the reception of the HS-DSCH channel.

The HS-SCCH channel is made of two separate parts. The first part, which corresponds to the first slot in the TTI, is used to signal to the different users the presence of data on the associated HS-DSCH. The receiver 108 therefore continuously monitors the part-1 of the HS-SCCH channel in order to know when HS-DSCH reception is required. The HS-SCCH part-1 also contains information on the transmission format of the HS-DSCH. The modulation scheme (QPSK or 16QAM) and the number of spreading codes used by the HS-DSCH are signalled using the HS-SCCH part-1. The last two slots of the HS-SCCH TTI, also referred to HS-SCCH part-2, contain information required to configure the channel decoding section 107 of the receiver 108.

The HS-SCCH part-1 contains information that can be used by the demodulation unit 106 for the HS-DSCH reception. Moreover, there is a gap of one slot between the end of the HS-SCCH part-1 slot and the start of the HS-DSCH TTI. It is therefore possible to modify the configuration of the demodulation unit 106 depending on the information carried in the decoded HS-SCCH part-1. This is possible as long as the decoding unit 107 can recover the transmitted information in less than one slot. If this is not the case, it is still possible to adapt the configuration of the demodulation unit 106 with some extra buffering.

The demodulation unit 106 can operate with two distinct configurations. The default configuration is used to monitor the information on the HS-SCCH channel. This default configuration will typically have a low computational complexity and therefore low power consumption. However, the link level performance may not be ideal. When the HS-SCCH part-1 information indicates that information needs to be received on the HS-DSCH channel, the second mode of operation of the demodulation is selected. This second configuration, also referred to hereinafter as HS-DSCH configuration, can be more complex and may require more power than the default configuration. However, it is expected that the HS-DSCH configuration offers better performance than the default configuration. By using this approach, it is possible to use a low power consumption receiver when the HS-SCCH channel is being monitored with no HS-DSCH information needs to be received. However, it still offers good link level performance when user data is transmitted on the HS-DSCH channel.

Figure 3:
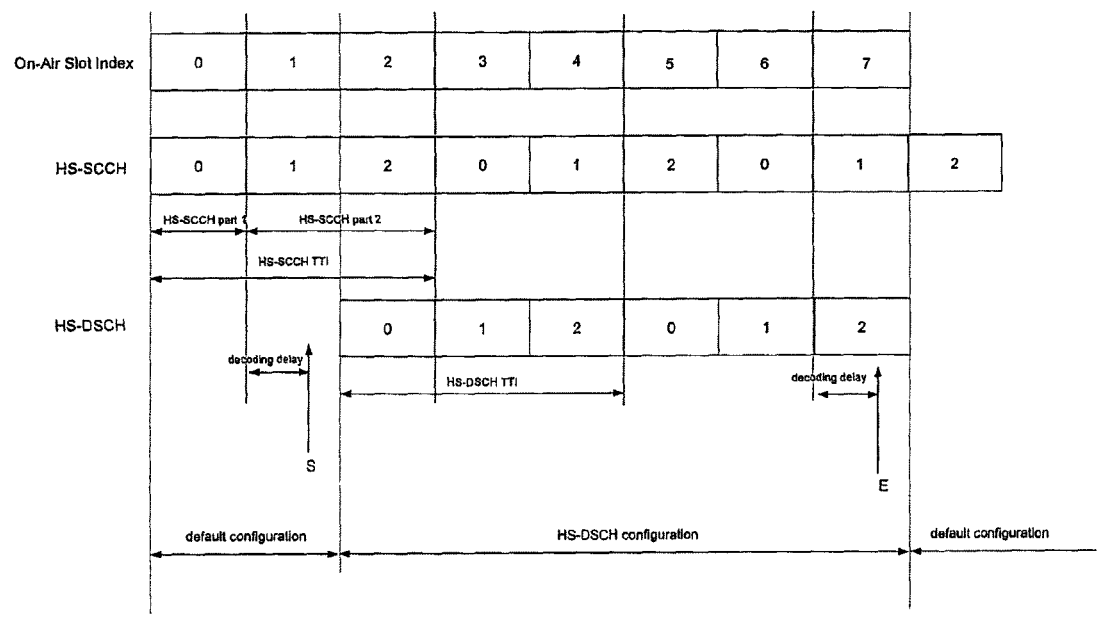
FIG. 3 illustrates an example of how the configuration of a demodulation unit switches between two different configurations in an embodiment of the invention.

FIG. 3 presents an example of the circumstances in which the demodulation unit 106 switches between the default configuration and the HS-DSCH configuration. At the start of the reception, the demodulation unit 106 operates in the default configuration. In this example, the HS-SCCH part-1 received in slot 0 indicates that data needs to be received on the HS-DSCH channel. This information will be received in on-air slots with indices 2, 3 and 4. The decoded HS-SCCH part-1 information becomes available during slot 1. At the end of slot 1, the receiver 108 therefore switches to the HS-DSCH configuration and reception of the HS-DSCH information can start. At that point, both HS-DSCH and HS-SCCH channels are processed with the demodulation unit 106 using the HS-DSCH configuration. The arrow S indicates the point at which the receiver 108 finishes decoding the HS-SCCH part 1 of slot 0 and determines that HS-DSCH reception is required at the commencement of slot 2. The HS-DSCH configuration needs to stay active until no HS-DSCH data is received. Hence, the default configuration cannot be used any earlier than the start of the on-air slot 5. In the example illustrated in FIG. 3 it is assumed that the HS-SCCH part-1 received in on-air slot 3 indicates that a second HS-DSCH TTI needs to be demodulated. In this case, the HS-DSCH configuration stays active until the end of on-air slot 7. From that point on, the monitoring of the HS-SCCH channel is performed using the default configuration. The arrow E indicates the point at which the receiver 108 finishes decoding the HS-SCCH part 1 of slot 6 and determines that HS-DSCH is not required beyond the end of slot 7. The receiver 108 continues in the default mode until some further HS-SCCH part-1 indicates that data needs to be received on the HS-DSCH.

The use of multiple configurations for the receiver 108 may require the allocation of separate resources for each of the configuration to be used. These resources could either be hardware resources, software resources or a combination of both. Hence, it is possible that the use of multiple receiver configurations will increase the implementation complexity of the receiver. However, in a preferred embodiment of the described invention, the implementation of different receiver configurations is achieved by dynamically enabling and disabling isolated elements in the receiver chain.

Figure 4:
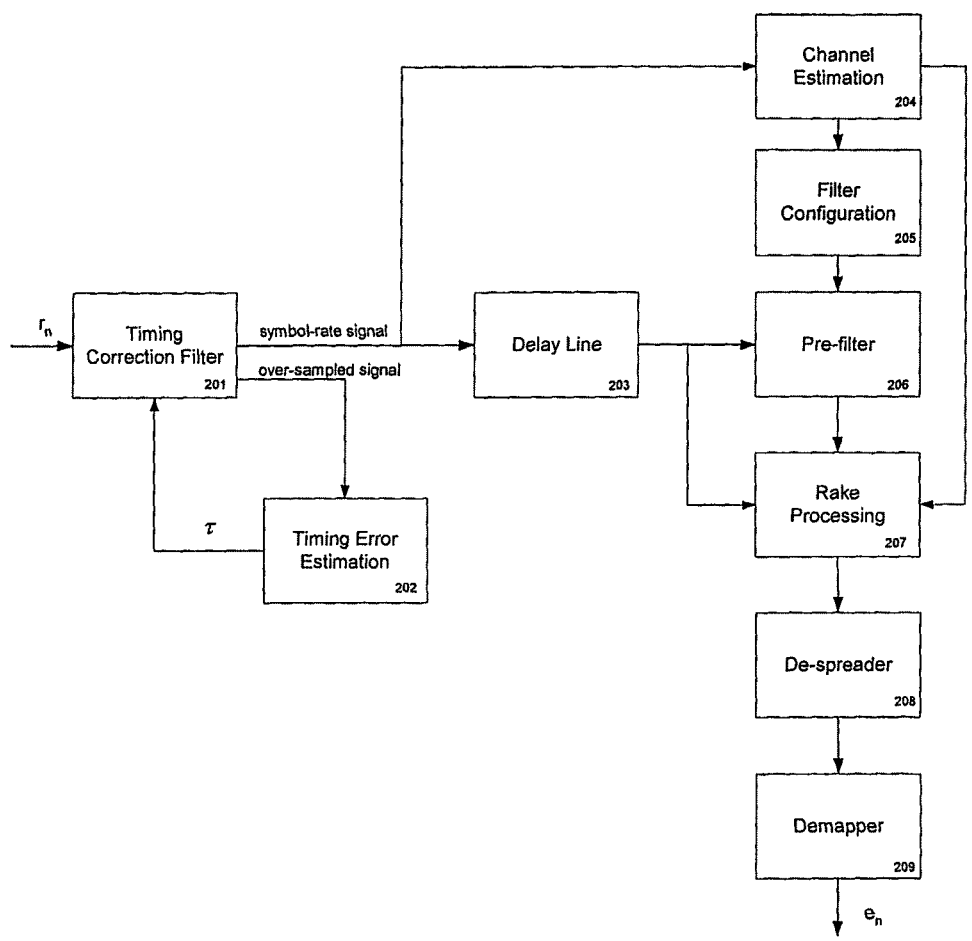
FIG. 4 presents an embodiment of a demodulation unit according to the invention.

FIG. 4 presents one possible embodiment of the demodulation unit 106. The first processing stage in the proposed architecture applies a timing correction to the received signal. The timing correction filter 201 processes the received signal which is over-sampled and generates two output signals. The timing correction filter 201 applies a delay to the received signal and outputs two different versions of this delayed signal. The first output signal is generated with a sampling rate equal to that of the input signal. This first output signal is also decimated, using a fixed phase, to symbol rate in order to generate the second output signal. Hence, the timing correction filter 201 produces two output signals having different sampling rates.

The timing correction filter unit 201 can be implemented using Fractional Delay Filters (FDF) combined with a decimation stage to generate the symbol-rate output. The application of the proposed receiver architecture is not limited to any specific implementation of the FDF section. Different possible approaches can for example by found in *Principles of Fractional Delay Filters*, V. Valikimaki, T. I. Laasko, *IEEE International Conference on Acoustics Speech and Signal Processing*, June 2000.

The timing correction applied by unit 201 is controlled by the estimated timing error τ derived in the timing error estimation unit 202. The timing error estimation unit 202 derives an estimate of the timing error in the received signal from the over-sampled signal output by 201. A class of timing error estimation techniques operating at the baud rate is described in "*Timing recovery in digital synchronous data receivers*", K. H. Mueller and M. Muller, *IEEE Transactions on Communications, Vol. COM*-24, *no.* 5, May 1976.

Following the timing adjustment made in 201, the receiver estimates the characteristics of the propagation channel in unit 204. The channel estimates produced by unit 204 correspond to the propagation channel sampled at the symbol rate. Since the processing units using the channel estimates (205 and 207) operate on the symbol-rate version of the signal, there is no benefit in generating an over-sampled representation of the propagation environment. The channel estimation unit 204 will usually use the training sequence and/or pilot signal that is typically embedded in the transmitted signal. In the HSDPA system for example, the Common Pilot Channel (CPICH) can be used to estimate the propagation environment. Different techniques can be used to generate the channel estimates from this pilot signal. Typically, the channel impulse response is estimated by correlating the received samples with the known pilot channel symbols. A number of techniques can then be used to refine these initial channel estimates. It is possible, for example, to filter the different channel taps in order to reduce the power of the estimation noise. Such techniques are described in "*Adaptive Channel Estimation in DS-CDMA Systems*", J. W. Choi and Y. H. Lee, *ECTI Transactions on Electrical Engineering, Electronics and Communications, vol. 2, no. 1*, February 2004.

The channel estimation unit 204 also returns an estimate of the noise power in the received signal. It should be noted that this estimate should only include the power of the noise corresponding to signals that cannot be equalised by the receiver. This can be achieved by estimating the combined power of the thermal noise and the inter-cell interference. Techniques making it possible to calculate the power of both intra-cell and inter-cell interference are described in "*Improving Channel Decoder Performance on the CDMA Forward Link*", *IEEE Transactions on Wireless Communications, vol. 4, no. 3*, May 2005.

The filter configuration unit 205 takes the information provided by the channel estimation unit 204 and derives the coefficients of the filter 206. Different implementations of the filter configuration unit 205 can be selected and their description is beyond the scope of this document. The reader is referred to *Chip-Level Channel Equalization in WCDMA Downlink*, K. Hooli, M. Juntti, M. J. Heikkila, P. Komulainen, M. Latva-aho, J. Lilleberg, *EURASIP Journal on Applied Signal Processing*, August 2002 for a review of different possible implementations. It should however be noted that it is typical for the filter computation unit 205 to implement some sort of matrix inversion processing.

The coefficients calculated in 205 are then used to configure the filter 206 applied to the symbol-rate signal output by the timing correction unit 201. It can be seen from FIG. 4 that the signal goes first through a delay line 203 before being filtered. This delay line aims at aligning the signal being filtered with the coefficients of the filter. The generation of the channel estimates and the derivation of the filter configuration will usually have delays associated with them. For example, filtering is usually employed in the channel estimation unit 204. Such filtering operation will introduce a delay in the generation of the channel estimates. This delay is equal to the group delay of the filter being employed. Moreover, the generation of the filter coefficients using the channel estimates is not instantaneous. Hence, the delay introduced by the processing in unit 205 also needs to be taken into account. By delaying the received signal using the delay line 203, it is possible to align the signal filtered in 206 with the correct tap coefficient values. In order to achieve a perfect correction, the delay introduced in the delay line should be set equal to the combined delay through the channel estimation and filter configuration units.

Following filtering in 206, the signal is processed by the Rake processing unit 207. In the described embodiment, the Rake processing unit 207 can either process samples from the output of the pre-filter 206 or directly from the delay line 203.

The I/Q samples generated by the Rake unit 207 are input to the de-spreader 208. The de-spreader simply correlates the input samples against the combined spreading and scrambling code for each of the physical channels to be received. For each physical channel, a single output sample is generated when the correlation has been calculated over the spreading factor of the given channel.

The de-spreading unit 208 generates a series of I/Q samples for each physical channel to be received. These I/Q samples then need to be demodulated in order to generate soft decisions to be passed to the error-correction decoding unit 107. The processing to be performed depends on the modulation format used by the transmitter and is implemented in unit 209. A possible implementation of the demapper for the reception of the 16QAM modulation can be found in "*A soft decision 16-QAM demodulation algorithm for multipath affected DVB-T systems*", S. L. Linfoot, L. P. Gao, *IEEE Transactions on Consumer Electronics*, November 2005.

In the embodiment presented in FIG. 4, it is possible to switch between two configurations without the need for any duplicated hardware or software resources. When information needs to be received on the HS-DSCH channel, the receiver is configured to operate as is described above, this being the HS-DSCH configuration. In this case, the receiver implements an LMMSE equaliser. In such a configuration, a large part of the performed computations are due to the matrix inversion operation implemented in 205 and to filtering in 206. Hence, in order to reduce the power consumption of the receiver when only the HS-SCCH channel needs to be monitored, these two processing units are disabled, this being the default configuration. When this operation mode is selected, the Rake processing unit 207 processes samples directly from the delay line 203. By disabling the filter configuration unit 205 and the pre-filter 206, the receiver operates in the manner of a conventional Rake receiver. Hence, it is possible to switch between an LMMSE equalisation mode and a Rake processing mode simply by adaptively switching on and off the filter configuration 205 and pre-filter 206 processing. Two different configurations are supported without requiring any extra resource or any duplication in the processing stages.

When the default configuration is selected, it is possible to modify the delay introduced in 203 in order to take into account the group delay of the pre-filter 206. By doing so, the overall delay through the receiver is identical for the two different configurations.

Alternatively, it would be possible to implement the default configuration by simply setting the coefficients of the pre-filter 206 such that the frequency response is flat in the frequency domain (i.e. only the centre tap should be non-zero). When such an approach is used, it is possible to alternate between the default configuration and the HS-DSCH configuration simply by modifying the pre-filter coefficients. When the default configuration is selected it is possible to disable the filter configuration unit 205 in order to reduce the power consumption.

In a further variant, on switching from the HS-DSCH mode to the default mode, the pre-filter coefficients remain as last set by unit 205 whilst the default mode remains current. In this way, a saving is made in that unit 205 does not operate in the default mode.

In the foregoing discussions of the proposed receiver architecture, it was assumed that most of the processing was performed at the symbol rate. It should however be stressed that the application of the proposed invention is not limited to this case. It will be obvious to people skilled in the art that the approach can be used with over-sampled receivers.

It should also be noted that the proposed scheme can be used when the number of receiver configurations is larger than two. For example, it would be possible to have multiple configurations designed to cope with varying numbers of HS-DSCH physical channels to receive.

The invention claimed is:

1. A method of ameliorating channel effects present in a signal received through a channel, wherein the signal conveys at least first and second information streams and the method comprises the steps of:
    determining from information in the first stream that the second stream is to be received; and
    processing the signal to ameliorate channel effects, when the second stream is to be received, in a first manner comprising filtering the signal through filter means to ameliorate channel dispersion and then processing the signal through Rake receiver means or, when the second stream is not to be received, in a second manner comprising processing the signal through the Rake receiver means without prior amelioration of channel dispersion by the filter means,
    wherein the signal is an HSDPA transmission comprising, as the first stream, an HS-SCCH channel and, as the second stream, an HS-DSCH channel.

2. A method according to claim 1, wherein the filter means is a pre-filter to the rake receiver means which, when operated together, form the basis of an LMMSE receiver architecture.

3. A program for causing a data processing apparatus to perform the method of claim 1.

4. A method of ameliorating channel effects present in a signal received through a channel, wherein the signal conveys at least first and second information streams and the method comprises the steps of:
    determining from information in the first stream that the second stream is to be received; and
    processing the signal to ameliorate channel effects, when said second stream is to be received, in a first manner comprising processing the signal through Rake receiver means after filtering the signal through filter means to ameliorate channel dispersion with the filter means adapting to track channel dispersion changes or, when the second stream is not to be received, in a second manner comprising processing the stream through the Rake receiver means without adaptation of the filter means to track channel dispersion changes,
    wherein the signal is an HSDPA transmission comprising, as the first stream, an HS-SCCH channel and, as the second stream, an HS-DSCH channel.

5. A method according to claim 4, wherein the filter means is a pre-filter to the rake receiver means which, when operated together, form the basis of an LMMSE receiver architecture.

6. A signal processing apparatus for ameliorating channel effects present in a signal received through a channel, the apparatus comprising:
    a filter means for filtering the signal to ameliorate channel dispersion; and
    a Rake receiver means for processing the signal,
    wherein the signal received via the channel can be processed in at least first and second modes wherein, in said first mode, channel dispersion in the signal is ameliorated by the filter means before processing the signal through the Rake receiver means and, in said second mode, the signal is processed by the Rake receiver means without prior amelioration of channel dispersion by the filter means,
    wherein a transition between the first and second modes is triggered by the nature of the signal, and
    wherein the signal comprises a first information stream and a second information stream, the first information stream serving to announce activation of the second information stream, wherein the first mode is used when the second information stream is present and the second mode is used when the second information stream is absent, and
    wherein the signal is an HSDPA transmission comprising, as the first information stream, an HS-SCCH channel and, as the second information stream, an HS-DSCH channel.

7. A signal processing apparatus according to claim 6, wherein the filter means is a pre-filter to the Rake receiver means which, when operated together, form the basis of an LMMSE receiver architecture.

8. A signal processing apparatus for ameliorating channel effects present in a signal received through a channel, the apparatus comprising:
    a filter means for filtering the signal to ameliorate channel dispersion;
    a Rake receiver means; and
    means for determining from an assessment of the channel a configuration for the filter means,
    wherein the signal received via the channel can be processed in at least first and second modes, wherein, in said first mode, alteration of the configuration of the filtering means is permitted and in which the filter means operates on the signal en route to the Rake receiver means and, in said second mode, alteration of said configuration to track channel dispersion is not permitted,
    wherein a transition between the first and second modes is triggered by the nature of the signal, and
    wherein the signal comprises a first information stream and a second information stream, the first information stream serving to announce activation of the second information stream, wherein the first mode is used when the second information stream is present and the second mode is used when the second information stream is absent, and
    wherein the signal is an HSDPA transmission comprising, as the first information stream, an HS-SCCH channel and, as the second information stream, an HS-DSCH channel.

9. A signal processing apparatus according to claim 8, wherein the filter means is a pre-filter to the Rake receiver means which, when operated together, form the basis of an LMMSE receiver architecture.

* * * * *